US008651055B2

(12) United States Patent
Dreger et al.

(10) Patent No.: US 8,651,055 B2
(45) Date of Patent: Feb. 18, 2014

(54) GULP GUARD

(76) Inventors: Sheri J. Dreger, Deer Trail, CO (US);
Kenneth W. Dreger, Deer Trail, CO (US)

(*) Notice: Subject to any disclaimer, the term of this patent is extended or adjusted under 35 U.S.C. 154(b) by 0 days.

(21) Appl. No.: 13/495,118

(22) Filed: Jun. 13, 2012

(65) Prior Publication Data

US 2013/0192528 A1 Aug. 1, 2013

Related U.S. Application Data

(60) Provisional application No. 61/591,564, filed on Jan. 27, 2012.

(51) Int. Cl.
*A01K 5/01* (2006.01)

(52) U.S. Cl.
USPC .................. 119/61.5; 119/61.55; 30/130

(58) Field of Classification Search
USPC ............ 119/61.5, 61.51, 61.53, 61.54, 61.55; D30/129, 130, 131, 132
See application file for complete search history.

(56) References Cited

U.S. PATENT DOCUMENTS

| D46,288 | S | * | 8/1914 | Moe | D30/130 |
|---|---|---|---|---|---|
| D133,862 | S | * | 9/1942 | Kinkel | D30/130 |
| 3,505,977 | A | * | 4/1970 | Mancini | 119/61.51 |
| D219,645 | S | * | 1/1971 | Rabe | D7/555 |
| 3,589,340 | A | * | 6/1971 | Beliles | 119/61.54 |
| 4,314,650 | A | * | 2/1982 | Cillario | 220/23.83 |
| D270,672 | S | | 9/1983 | Zelinger | |
| D296,020 | S | * | 5/1988 | McCarroll | D30/130 |
| D312,896 | S | | 12/1990 | Goetz | |
| 5,148,951 | A | * | 9/1992 | Moure et al. | 222/386 |
| 5,377,621 | A | * | 1/1995 | Camm | 119/61.54 |
| 5,706,721 | A | * | 1/1998 | Homes | 99/495 |
| 5,887,544 | A | * | 3/1999 | Popelier | 119/61.54 |
| 6,153,237 | A | * | 11/2000 | Ferguson | 426/115 |
| 6,314,911 | B1 | * | 11/2001 | Kaytovich | 119/61.5 |
| D490,577 | S | | 5/2004 | Steinbacher et al. | |
| D511,593 | S | | 11/2005 | Ebesu | |
| D590,109 | S | | 4/2009 | Anderson et al. | |
| D591,162 | S | | 4/2009 | Slabaugh | |
| D592,813 | S | | 5/2009 | Newsome et al. | |
| 7,753,000 | B1 | * | 7/2010 | Turner | 119/61.2 |
| 7,802,684 | B2 | * | 9/2010 | Shew et al. | 206/541 |
| 7,895,975 | B2 | | 3/2011 | Markham | |
| D636,944 | S | | 4/2011 | Anderson et al. | |
| D642,336 | S | | 7/2011 | Desrosiers | |
| 8,033,420 | B2 | * | 10/2011 | Roseblade et al. | 220/731 |
| 8,082,882 | B1 | * | 12/2011 | Tharp | 119/60 |
| 8,083,090 | B2 | * | 12/2011 | Cocchiarella | 220/521 |

(Continued)

*Primary Examiner* — Yvonne Abbott
(74) *Attorney, Agent, or Firm* — Buckingham, Doolittle & Burroughs, LLC

(57) ABSTRACT

A pet bowl device designed primarily for pet owners comprises a bowl unit and an insert component. The bowl unit comprises an interior and exterior portion, with the insert component being positioned on the interior portion. The insert component comprises a top surface and a bottom surface and a plurality of individual openings positioned in a spaced apart relationship along the top surface. The plurality of individual openings is smaller in diameter than the bowl unit. The individual openings will divide up the serving size of pet food. Thus, the individual openings separate the food into smaller sections, which prevents the pet from opening their mouth wide enough to consume large gulps of food at once. Pets will then be forced to take smaller bites while eating, which slows down the rate at which the pet consumes its food and aids in the prevention of abdominal bloating (GDV).

14 Claims, 5 Drawing Sheets

(56) References Cited

U.S. PATENT DOCUMENTS 8,342,128 B2 * 1/2013 Rocker .................. 119/61.2

2006/0005774 A1 1/2006 Newman Bornhofen
2006/0213447 A1 9/2006 Kitchen et al.
2008/0023482 A1 * 1/2008 Ricciardi .................. 220/556

* cited by examiner

GULP GUARD

CROSS-REFERENCE

This application claims priority from Provisional Patent Application Ser. No. 61/591,564 filed Jan. 27, 2012.

BACKGROUND

When pets eat out of traditional food bowls, many pets have the tendency of gulping or ingesting their food in large bites. This may cause a reaction known as Gastric Dilation Volvous (GDV) in which, when dry food is consumed too quickly, it expands in the pet's stomach and causes bloating. If GDV occurs and immediate veterinary treatment is not given, the pet may die from this reaction. In other situations, the pet may vomit or aspirate due to gulping, all leading to expensive veterinary bills to relieve the pet. This process can be stressful on the pets and the owners alike, and may repeat itself frequently. Thus, a device for slowing down the rate at which pets consume their food is necessary.

There is a need for an improved pet bowl that is designed to prevent a pet from gulping down their food too quickly, which can lead to abdominal bloating and/or GDV. The present invention discloses a pet bowl device that permits a pet owner to divide a pet's meal into easily consumable and distinct serving sizes. This device provides an innovative multi-cup design that separates the food into smaller portions, and prevents the pet from opening its mouth wide enough to consume large gulps of food at once. Stated differently, the device forces a pet to take smaller bites while eating, which in turn prevents abdominal bloating, vomiting, aspiration, and the corresponding expense of veterinary bills for emergency treatments. Using this invention promotes the overall health of pets. Anyone with pets would benefit from the safety this invention provides.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a pet bowl device designed primarily for pet owners. The pet bowl device comprises a bowl unit comprising an interior portion and an exterior portion, and an insert component positioned on the interior portion of the bowl unit. The insert component comprises a top surface and a bottom surface and a plurality of individual openings positioned in a spaced apart relationship to one another along the top surface. Each of the plurality of individual openings is smaller in diameter than the bowl unit. The individual openings will divide up the serving size for the pet. Thus, the individual openings not only separate the serving size of pet food into smaller portions but they also prevent the pet from opening its mouth wide enough to consume large gulps of food at once. Pets will then be forced to take smaller bites while eating, which slows down the rate at which the pet consumes its food and aids in the prevention of abdominal bloating (GDV).

Furthermore in the preferred embodiment of the present invention, the pet bowl device would be manufactured in a variety of sizes to suit small, medium or large dogs, cats or other pets. The pet bowl device preferably comprises up to seven separate individual openings built into the insert component depending upon the pet for which it is intended.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DESCRIPTION OF PREFERRED EMBODIMENTS

Figure 1:
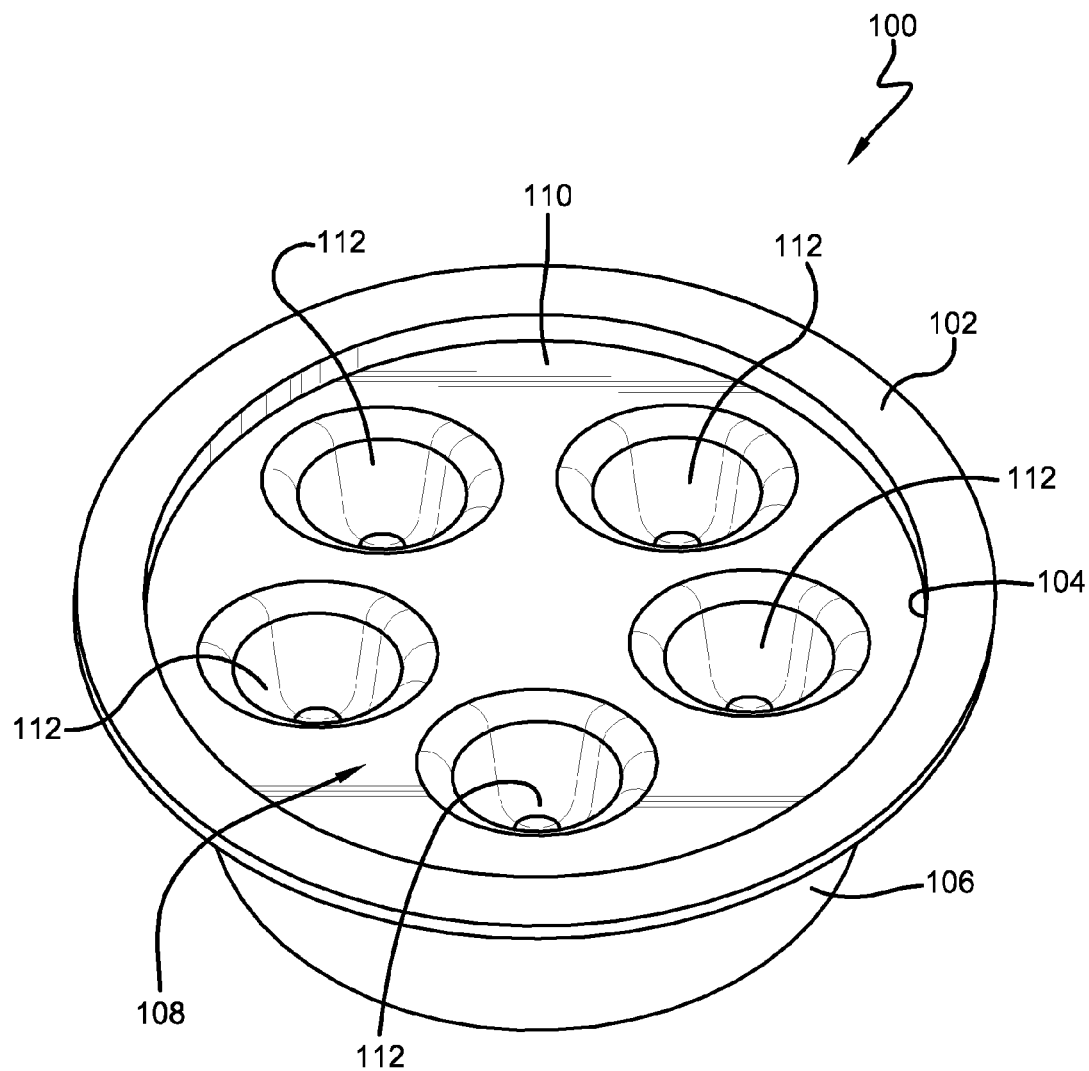
FIG. 1 illustrates a perspective view of a pet bowl device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a pet bowl device that is designed to prevent a pet from gulping down its food too quickly, which can lead to abdominal bloating and/or GDV. The pet bowl device comprises a multi-cup pet food bowl that permits a pet owner to divide up the serving size of food for the pet into easily consumable and distinct portions. Specifically, the pet bowl device comprises a bowl unit and an insert component positioned on the interior portion of the bowl unit. The insert component comprises a plurality of individual openings positioned in a spaced apart location to one another along the top surface. The plurality of individual openings is smaller in diameter than the bowl unit, and will divide up the serving size of food for the pet. Thus, the individual openings not only separate the pet food into smaller portions, but they also prevent the pet from opening its mouth wide enough to consume large gulps of food at once. The device forces pets to take smaller bites while eating, which slows down the rate at which the pet consumes its food and reduces the likelihood of abdominal bloating and/or GDV.

The pet bowl device would be manufactured in a variety of sizes to suit small, medium or large dogs, cats, or other types of pets that typically eat from a pet bowl. The pet bowl device preferably comprises up to seven separate individual openings built into one single insert component depending upon the pet for which it is intended. Using this invention promotes the overall health of pets. Anyone with pets would benefit from the safety this invention provides.

Referring initially to the drawings, FIG. 1 illustrates a pet bowl device 100 designed primarily for pet owners. The pet bowl device 100 comprises a bowl unit 102 comprising an interior portion 104 and an exterior portion 106. The bowl unit 102 has the appearance of a typically constructed pet bowl as is known in the art. Typically, the bowl unit 102 is circular in shape, however any other suitable shape can be used as is known in the art without affecting the overall concept of the invention. The bowl unit 102 would generally be constructed of metal or plastic, such as polycarbonate, acrylonitrile butadiene styrene (ABS) or polyvinyl chloride (PVC), though any other suitable material may be used to manufacture the bowl unit 102 as is known in the art without affecting the overall concept of the invention. The bowl unit 102 is approximately between 3 and 5 inches in depth, and approximately between 8 and 12 inches in diameter, and would vary according to pet serving and muzzle size.

The pet bowl device 100 further comprises an insert component 108 for positioning in the interior portion 104 the bowl unit 102. The insert component 108 comprises a top surface 110 and a bottom surface (not shown) and a plurality of individual openings 112 positioned along the top surface 110 in a spaced apart relationship to one another. Typically, the insert component 108 is circular in shape, however any other suitable shape can be used as is known in the art without affecting the overall concept of the invention, provided that it mates with the bowl unit 102. The insert component 108 would generally be constructed of plastic, such as polycarbonate, acrylonitrile butadiene styrene (ABS) or polyvinyl chloride (PVC), though any other suitable material may be used to manufacture the insert component 108 as is known in the art without affecting the overall concept of the invention. The insert component 108 is approximately between 1.75 and 3.25 inches in depth, and approximately between 7 and 11 inches in diameter. Typically, the insert component 108 is sized to be inset into the interior portion 104 of the bowl unit 102, however any other suitable size can be used as is known in the art without affecting the overall concept of the invention, provided that the size corresponds to the size of the bowl unit 102.

The insert component 108 can be a separate structure independent of and removable from the bowl unit 102. The insert component 108 can be secured to the interior portion 104 of the bowl unit 102 via gluing, fusing, bonding, etc., or any other suitable securing means as is known in the art. However, the insert component 108 does not have to be secured to the bowl unit 102 and can function without being secured. If the insert component 108 is removable, the insert component 108 can be removed and replaced with a different insert component, comprising more or less individual openings 112. Additionally, the insert component 108 can be formed as an integral unit with the bowl unit 102.

The insert component 108 further comprises a plurality of individual openings 112 positioned in a spaced apart relationship along the top surface 110. The plurality of individual openings 112 comprises from 2 to 7 openings, or any other suitable number as is known in the art. The plurality of individual openings 112 are smaller in diameter than the bowl unit 102. For example, the plurality of individual openings 112 comprise a diameter of approximately 1.5 to 2.5 inches, and a depth of approximately 1.5 to 3.0 inches.

Figure 2:
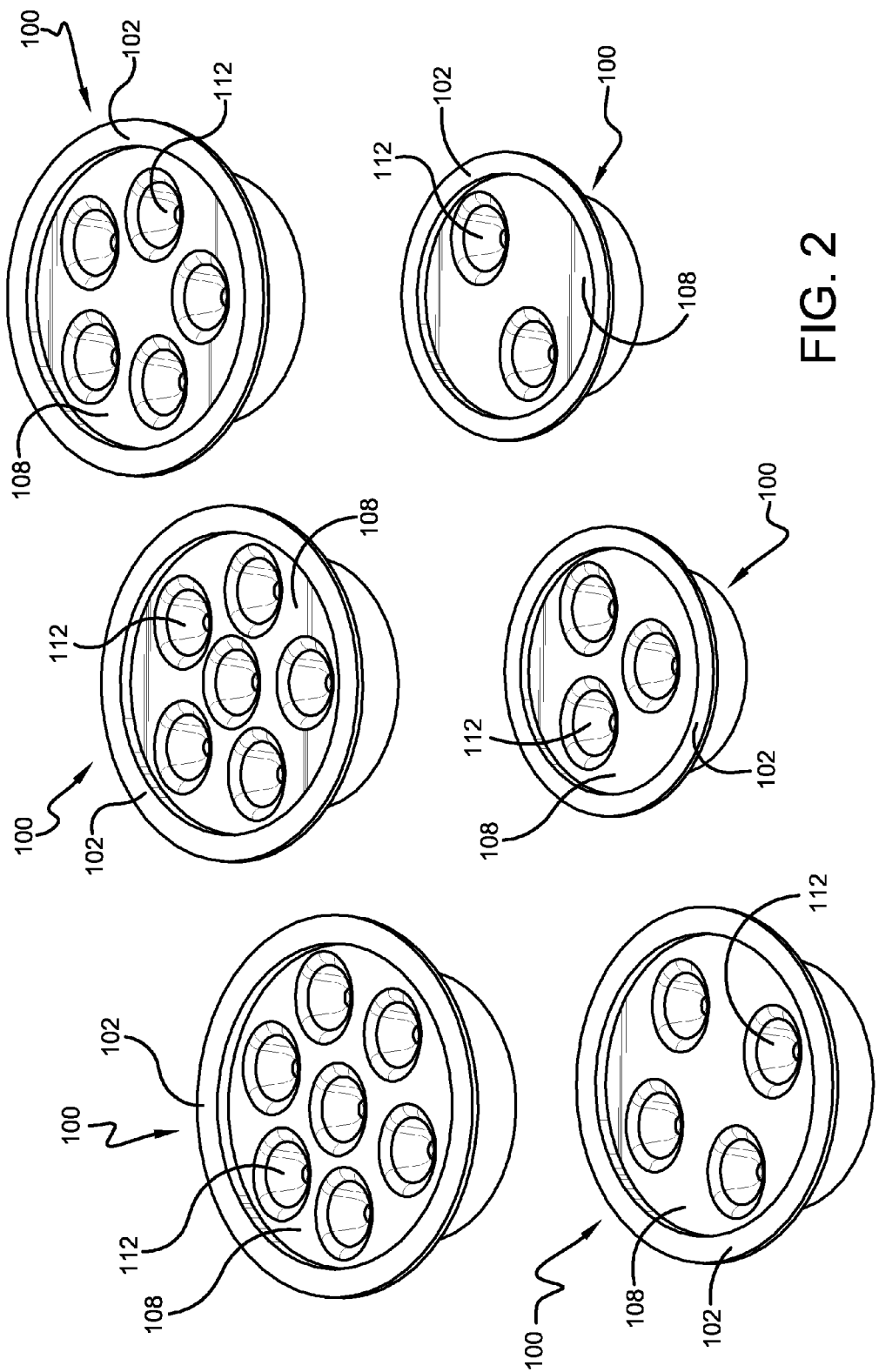
FIG. 2 illustrates a perspective view of multiple pet bowl devices with a plurality of individual openings in accordance with the disclosed architecture.

FIG. 2 illustrates multiple pet bowl devices 100 with a plurality of individual openings 112. The pet bowl device 100 comprises a bowl unit 102 comprising an interior portion 104 and an exterior portion 106, and an insert component 108 positioned on the interior portion 104 of the bowl unit 102 (see FIG. 1). The insert component 108 comprises a top surface 110 and a bottom surface (not shown) and a plurality of individual openings 112 positioned in a spaced apart relationship along the top surface 110 (see FIG. 1). The plurality of individual openings 112 comprises from 2 to 7 openings, or any other suitable number as is known in the art. The plurality of individual openings 112 are smaller in diameter than the bowl unit 102. The individual openings 112 will divide up the serving size of food for the pet.

The pet bowl device 100 is sized based on serving size and muzzle size of the pet. It is recommended to select a pet bowl device 100, where when the recommended serving size of pet food for the pet is placed in the plurality of openings 112, the pet food does not come all the way to the top of the openings 112, such as ⅜ to ½ inch down from the top of the openings 112. Thus, the individual openings 112 not only separate the pet food into smaller portions, but they also prevent the pet from opening its mouth wide enough to consume large gulps of food at once. The pet bowl device 100 forces pets to take smaller bites while eating, which slows down the rate at which the pet consumes its food and reduces the likelihood of abdominal bloating and/or GDV. Furthermore, the pet bowl device 100 can be customized and manufactured in a variety of different colors and designs depending upon user preference. Typically, the pet bowl device 100 is packaged for sale with the serving size (i.e., cups per serving) and muzzle size of the animal (i.e., small, medium, large and extra large) stated on the packaging.

Figure 3B:
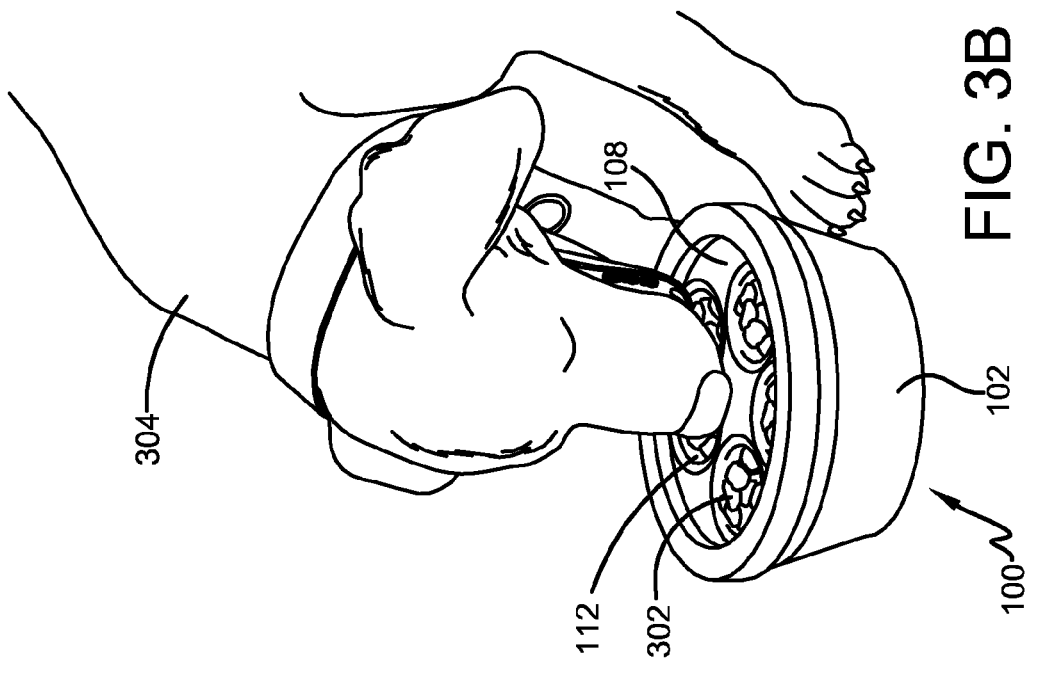
FIGS. 3A-B illustrates a perspective view of a dog using a prior art pet bowl and a dog using the pet bowl device in accordance with the disclosed architecture.
Figure 3A:
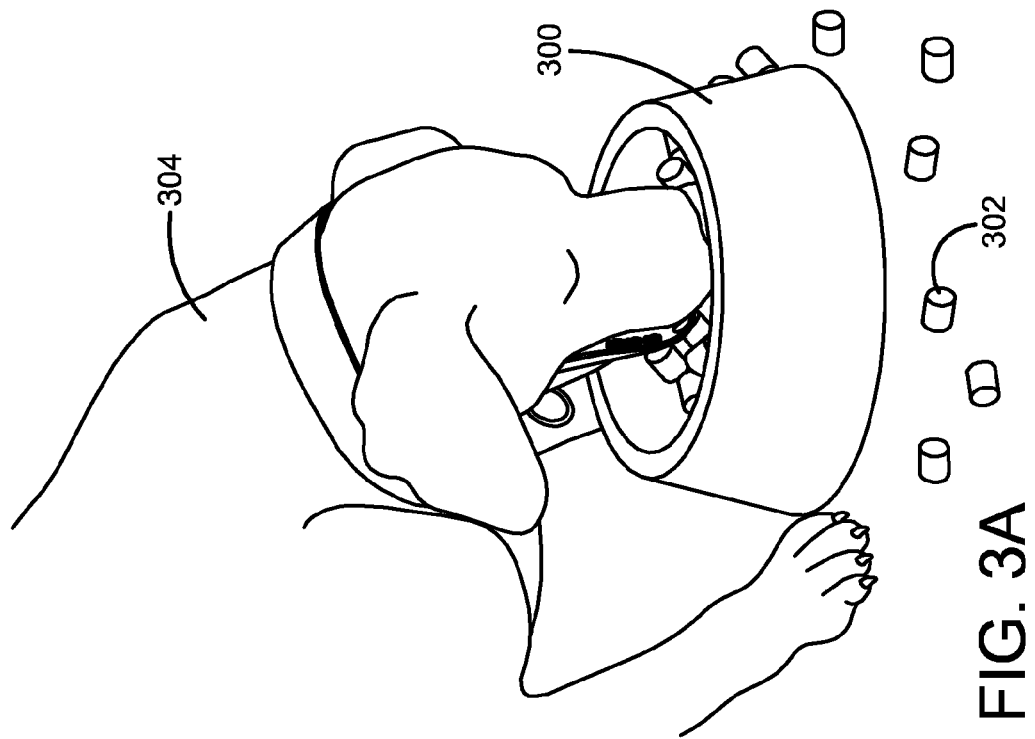

FIGS. 3A and 3B illustrate a dog 304 using a prior art pet bowl 300 and a dog 304 using the pet bowl device 100. Specifically, FIG. 3A illustrates the dog 304 using a prior art pet bowl 300. The prior art pet bowl 300 allows the dog 304 to gulp their food 302 in large bites. When dry pet food is consumed too quickly, it expands in the stomach and causes bloating. In contrast, FIG. 3B illustrates the dog 304 using a pet bowl device 100. The pet bowl device 100 comprises a bowl unit 102 and an insert component 108 positioned on the interior portion of the bowl unit 102. The insert component 108 comprises a plurality of individual openings 112 positioned in a spaced apart relationship along the top surface for holding pet food. The plurality of individual openings 112 of the insert component 108 permits a pet owner to divide up the serving size of a pet's meal into easily consumable and distinct portions. Thus, the pet bowl device 100 forces pets to take smaller bites while eating, which slows down the rate at which the pet consumes its food and reduces the likelihood of abdominal bloating, vomiting, aspiration, and the corresponding expense of veterinary bills for emergency treatments.

Figure 4:
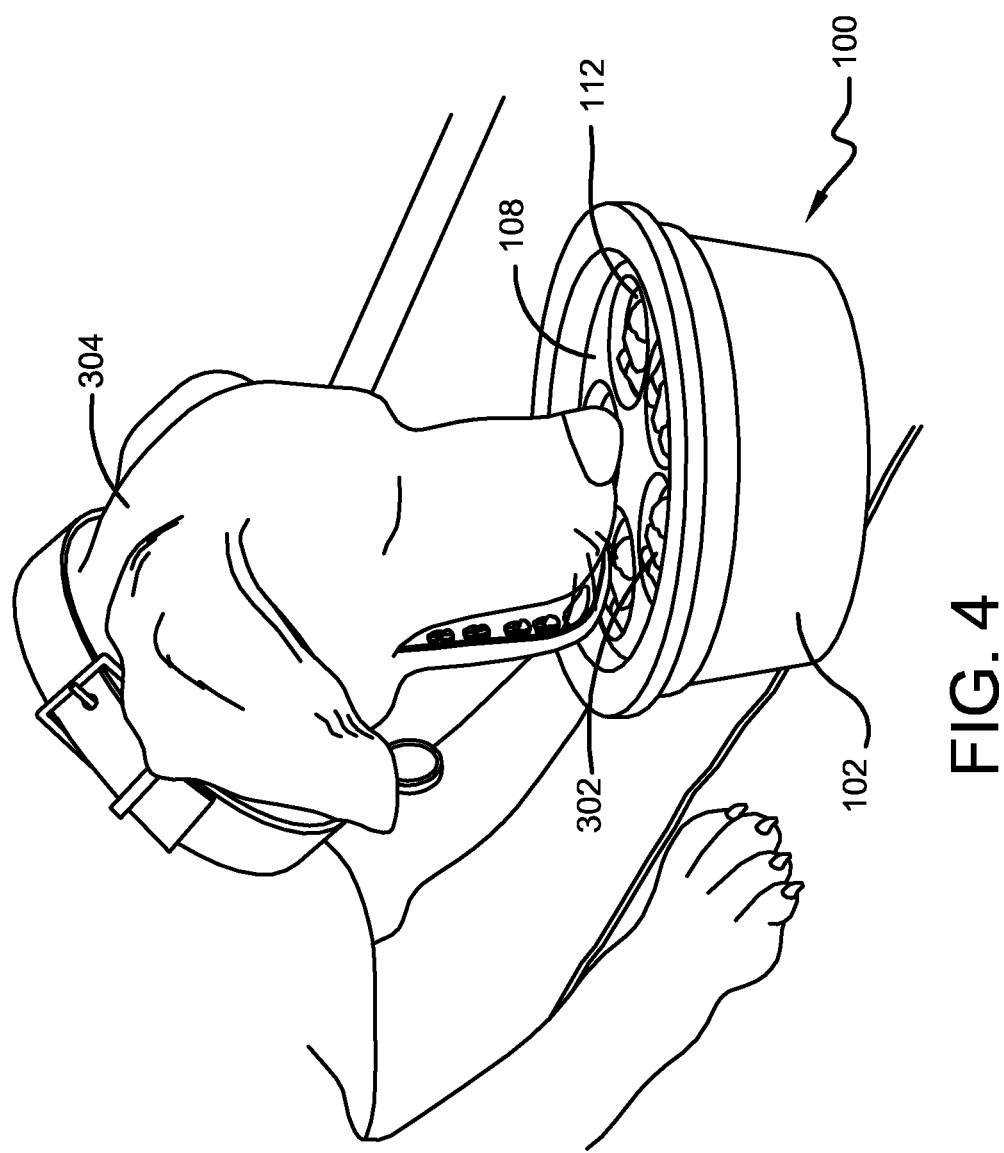
FIG. 4 illustrates a perspective view of a dog using the pet bowl device in accordance with the disclosed architecture.
Figure 5:
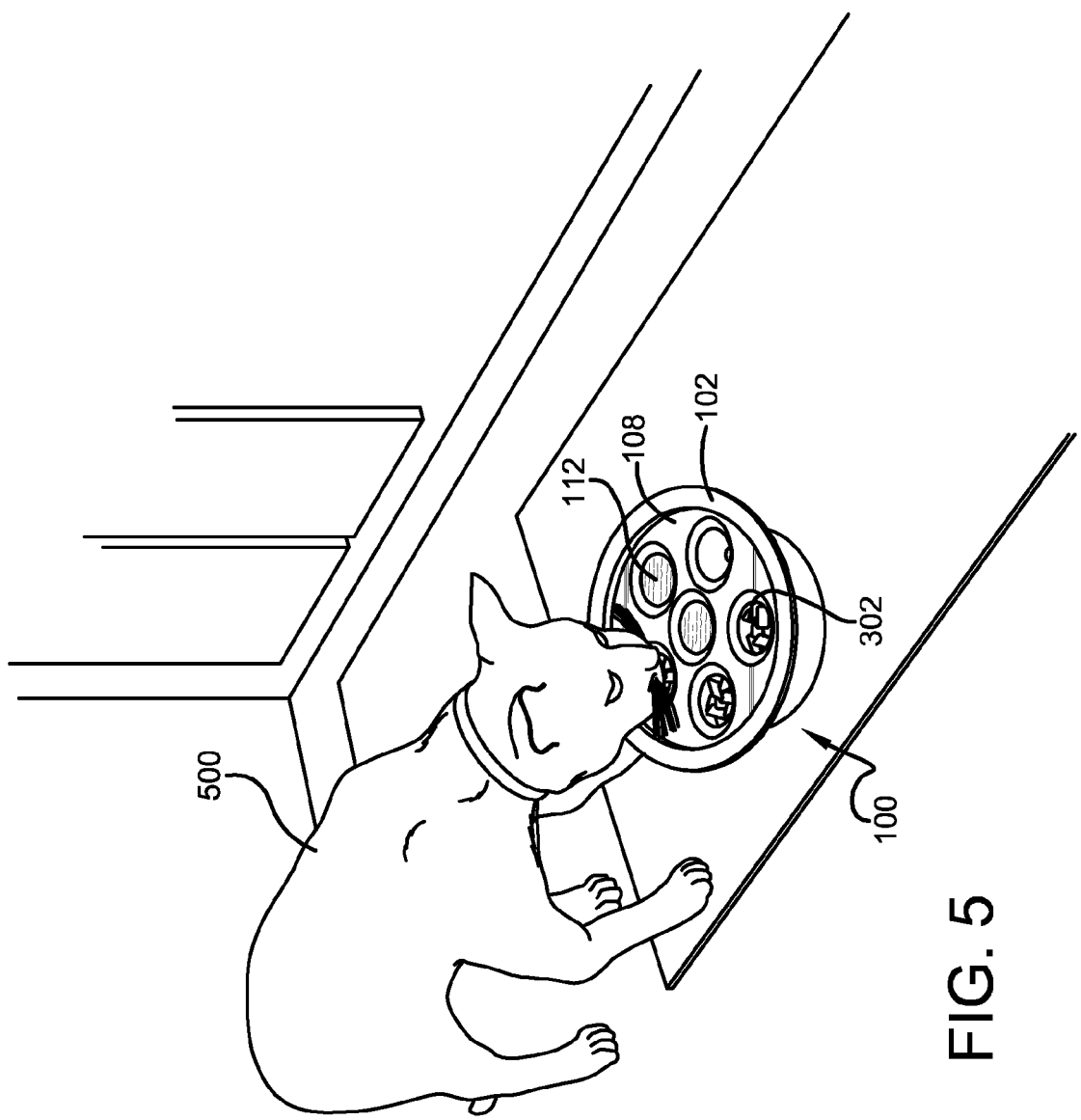
FIG. 5 illustrates a perspective view of a cat using the pet bowl device in accordance with the disclosed architecture.

FIGS. 4 and 5 illustrate a dog 304 and a cat 500 using the pet bowl device 100. In operation, a user (not shown) would select a pet bowl device 100 in a specific design and/or color, and of a specific serving and muzzle size, according to the size of their pet. The user would also choose a pet bowl device 100 with a bowl unit 102 and an insert component 108 that comprises a specific number of individual openings 112, depending upon the pet for which it is intended. Typically, a larger size pet would require a pet bowl device 100 with a large number of individual openings 112 (i.e., 5-7 individual openings), and a smaller size pet would require a pet bowl device 100 with a small number of individual openings 112 (i.e., 2-4 individual openings). A user would then divide up the serving size of pet food 302 into the individual openings 112, such that the pet food 302 does not come all the way to the top of the openings 112, but is about ⅜ to ½ inch down from the top. The user then places the pet bowl device 100 on the ground for the pet to eat from.

The pet bowl device 100 permits a pet owner to divide up the serving size of a pet's meal into easily consumable and distinct portions. The dog 304 or cat 500 would then be prevented from opening their mouth wide enough to consume large gulps of food at once. The pets would be forced to take smaller bites while eating, which in turn prevents abdominal bloating and/or GDV. Thus, the pet bowl device 100 is designed to slow down the rate at which pets consume their food. The pet bowl device 100 would be manufactured in a variety of sizes to suit small, medium or large dogs and cats alike. The pet bowl device 100 may comprise up to seven separate individual openings 112 built into one insert component 108 depending upon the pet for which it is intended.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A pet bowl device, comprising:
   a bowl unit comprising an interior portion and an exterior portion; and
   an insert component comprising a top surface and a bottom surface and a plurality of individual openings positioned in a spaced apart relationship along the top surface; and
   wherein the plurality of individual openings comprises a diameter of approximately 1.5 to 2.5 inches and a depth of approximately 1.5 to 3.0 inches, such that the plurality of individual openings create separate compartments and
   wherein the plurality of individual openings are round in shape and comprise a radius around a top edge and a full radius at a bottom of each of the individual openings; and
   wherein the insert component is formed as an integral unit with the bowl unit.

2. The pet bowl device of claim 1, wherein the plurality of individual openings comprises from 2 to 7 openings.

3. The pet bowl device of claim 1, wherein the plurality of individual openings are smaller in diameter than the bowl unit.

4. The pet bowl device of claim 1, wherein the bowl unit has a diameter of approximately 8 to 12 inches.

5. The pet bowl device of claim 1, wherein the bowl unit has a depth of approximately 3 to 5 inches.

6. The pet bowl device of claim 1, wherein the insert component is sized to be inset into the interior portion of the bowl unit.

7. A pet bowl device, comprising:
   a bowl unit comprising an interior portion and an exterior portion; and
   an insert component comprising a top surface and a bottom surface and a plurality of individual openings positioned in a spaced apart relationship along the top surface; and
   wherein the insert component is positioned on the interior portion of the bowl unit; and
   wherein the plurality of individual openings are smaller in diameter than the bowl unit; and
   wherein the plurality of individual openings comprises a diameter of approximately 1.5 to 2.5 inches and a depth of approximately 1.5 to 3.0 inches, such that the plurality of individual openings create separate compartments; and
   wherein the plurality of individual openings are round in shape and comprise a radius around a top edge and a full radius at a bottom of each of the individual openings.

8. The pet bowl device of claim 7, wherein the plurality of individual openings comprises from 2 to 7 openings.

9. The pet bowl device of claim 7, wherein the insert component is sized to be inset into the interior portion of the bowl unit.

10. The pet bowl device of claim 9, wherein the insert component is removable from the bowl unit.

11. The pet bowl device of claim 9, wherein the insert component is formed as an integral unit with the bowl unit.

12. A pet bowl device, comprising:
    a bowl unit comprising an interior portion and an exterior portion; and
    an insert component comprising a top surface and a bottom surface and a plurality of individual openings positioned in a spaced apart relationship along the top surface; and
    wherein the insert component is positioned on the interior portion of the bowl unit; and
    wherein the plurality of individual openings are smaller in diameter than the bowl unit; and
    wherein the plurality of individual openings comprises a diameter of approximately 1.5 to 2.5 inches and a depth of approximately 1.5 to 3.0 inches, such that the plurality of individual openings create separate compartments; and
    wherein the plurality of individual openings are round in shape and comprise a radius around a top edge and a full radius at a bottom of each of the individual openings; and
    wherein the insert component is formed as an integral unit with the bowl unit.

13. The pet bowl device of claim 12, wherein the plurality of individual openings comprises from 2 to 7 openings.

14. The pet bowl device of claim 13, wherein the bowl unit comprises a diameter of approximately 8 to 12 inches and a depth of approximately 3 to 5 inches.

\* \* \* \* \*